United States Patent Office 3,171,43
Patented Mar. 2, 196

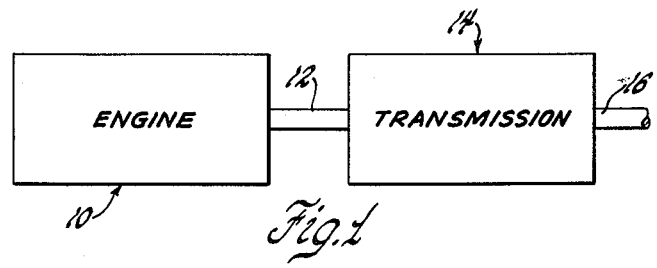
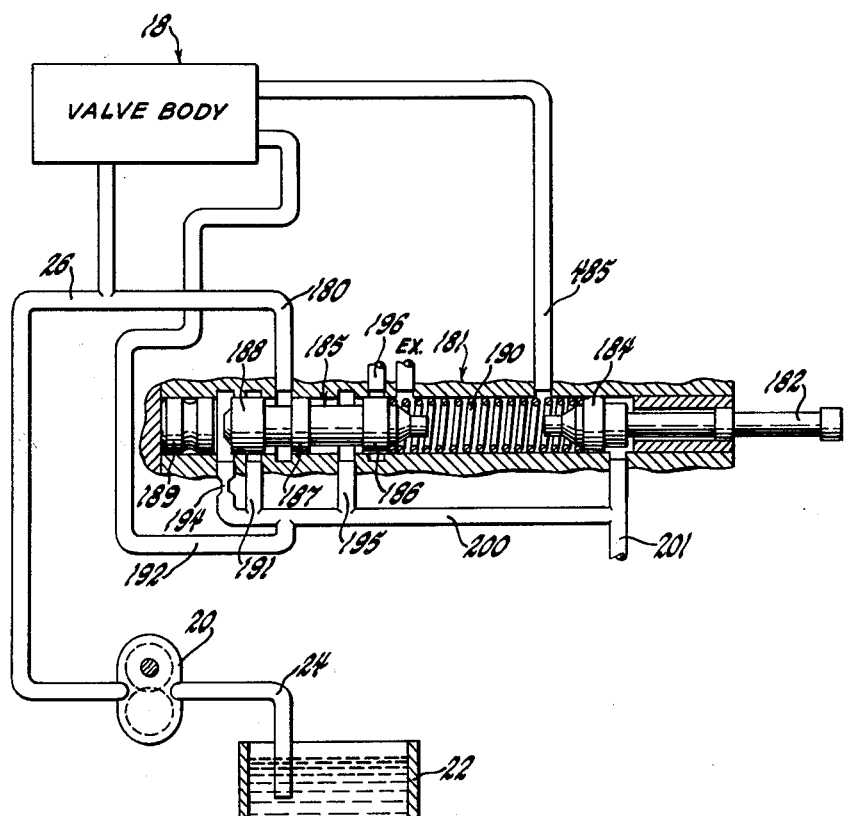

3,171,433
THROTTLE VALVES FOR AUTOMATIC TRANSMISSIONS
August H. Borman, Jr., and Forrest R. Cheek, Detroit, Mich., assignors to General Motors Corporation, Detroit, Mich., a corporation of Delaware
Original application Dec. 27, 1954, Ser. No. 477,832, now Patent No. 3,048,055, dated Aug. 7, 1962. Divided and this application July 31, 1962, Ser. No. 213,721
3 Claims. (Cl. 137—495)

This invention relates to throttle valves for automatic transmissions and more particularly for valves which regulate fluid pressure from a source in accordance with the throttle position of the engine driving the transmission.

This invention is a division of copending application Serial No. 477,832, filed December 27, 1954, now Patent No. 3,048,055 and assigned to the assignee of the present application. The disclosure of said copending application is incorporated herein by reference.

In the control of automatic transmission of, for example, the type described in the copending application, it is desirable that one fluid pressure utilized therein vary with engine throttle opening. Inasmuch as such a throttle valve offers some considerable resistance to throttle movement by the driver of the vehicle it is desirable to provide a power assist for such throttle movement.

Accordingly, it is an object of the present invention to provide a throttle valve for regulating fluid pressure in accordance with throttle opening, such valve being of such construction that movement of the same toward open position is assisted by the regulated fluid pressure from the valve.

In practicing the present invention use is made of a throttle valve which is linked to the throttle control of the engine so that throttle opening of the engine acts to cause the throttle valve to regulate fluid pressure which varies with the degree of throttle opening. Inasmuch as the throttle valve is influenced by spring pressure on parts thereof, such spring pressure offers resistance to throttle movement by the operator of the vehicle in which the transmission is installed. Consequently, it is desirable to provide an assist to such manual movement of the valve which assist is accomplished as set forth in the detailed description of the accompanying drawing in which:

FIGURE 1 is a diagrammatic illustration of an engine driving an automatic transmission which in turn can have its output connected to the drive of the vehicle; and FIGURE 2 is a diagrammatic illustration of the throttle valve associated with the automatic transmission.

Referring now to the drawing, 10 indicates generally an engine of well-known type which can have a throttle connected therewith for controlling the feed thereto. The output 12 of the engine serves an an input for the automatic transmission 14 which may be of any well-known type, but which preferably is of the type disclosed in the copending application before identified. The output shaft 16 of this transmission can be connected to drive the drive wheels of the vehicle associated with the engine and transmission.

Located within the transmission is a valve body 18 which contains valves for controlling the supplying of fluid under pressure to various parts of the transmission, such as friction elements and the like, controlling the conditioning of the gearing in the transmission. To supply fluid to this valve body use is made of a pump 20 which draws fluid from a sump 22 through a suction line 24 and delivers the same under pressure through supply line 26 to the valve body. A throttle valve incorporating the invention is ordinarily mounted within the valve body, but in this instance is shown outside the body for purposes of clarity.

A branch line 180 from the main supply line 65 leads the bore in the valve body which receives the throt valve indicated generally at 181. This valve is made of an accelerator pedal responsive member 182 having land 184 and a metering part 185 having lands 186, 1 and 188. A spring 190 is interposed between the pa 182 and 185. One end of the bore is closed by a plug 1§

This throttle valve operates as a metering valve in well-known fashion, that is, as the accelerator pedal throttle of the vehicle is moved to increase the throt opening of the carburetor, the part 182 is moved to t left as viewed in the drawings, compressing the spring 1 with resultant movement of the metering part 185 al to the left. When this occurs, the land 188 uncovers port connected to the line 191, permitting oil from t branch main supply line 180 to enter this line 191 a proceed therefrom into the main throttle valve pressu line 192. When pressure is developed in the parts su plied by the line 192, the result thereof is introduc through the restriction 194 into the bore of the body act on the left end of the land 188 and, as this pressu increases, it moves the metering part 185 to the rigl first closing the port connected to line 191 and next esta lishing a connection from branch line 195 to exhau through the bore of the valve at the exhaust port 1§ As the part 182 is moved further to the left, a great developed pressure is required in the line 192 to cau the metering valve part to move to the exhaust positi and hence throttle valve pressure, or TV pressure, i creases as the throttle is opened. This action is w known. A further branch line 200 extends to the bo of the throttle valve body to the right of land 184 to pr vide pressure which assists in manual movement of tl part 182. The assisting thrust applied to land 184 is le than the opposing thrust applied to land 188 since tl effective area of land 184 is decreased by the stem po tion of part 182. Line 200 also has a branch line 2( which extends to the detent valve. The pressure regulat by this throttle valve is utilized for control purposes well-known manner.

The invention is to be limited only by the scope of tl following claims.

What is claimed is:

1. In a transmission for a throttle controlled engin a pump for supplying fluid under pressure, throttle val means connected to said pump and adapted to regula pressure in accordance with manually determined thrott position, said throttle valve means including a movab valve member, a manually movable control member and spring interposed between said members for transmittir force between said members, first fluid pressure responsiv means on said valve member connected to pressure deli ered by said valve member and effective to apply a thrust said valve member tending to move said valve member one direction, second fluid pressure responsive means ass ciated with said manually movable control member co nected to pressure delivered by said valve member ar effective to apply a thrust to said manually movable co trol member tending to move said control member in direction opposite to said one direction, the thrust applic to said manually movable control member by said secon mentioned fluid pressure responsive means being less tha the thrust applied to said valve member by said first-mer tioned fluid pressure responsive means and acting in assis ance to manual force applied to said manually movab control member to move said valve against the thru applied to said valve member by said first fluid pressur responsive means, said first fluid pressure responsive mea moving the valve member in said one direction upc release of manual force from said control member.

2. In a transmission for a throttle controlled engin a pump for supplying fluid under pressure, throttle val ins connected to said pump and adapted to regulate pressure in accordance with manually determined throttle position, said throttle valve comprising a valve body, said valve body including a movable valve member, a manually movable control member and a spring interposed between said members for transmitting force between said members, said manually movable member being movable in response to manual force applied thereto to increase the pressure delivered by said valve member, a first chamber in said body including said valve member, a second chamber in said body including said control member, said first and second chambers being connected to pressure delivered by said valve member, said valve member in said first chamber providing a thrust in response to said pressure tending to bias said valve to a position to reduce the pressure delivered by said valve, said control member in said second chamber providing a thrust in response to said pressure less than the thrust provided by said valve member, the thrust of said control member tending to bias said valve member to increase the pressure delivered by said valve and acting in assistance to manual force applied to said control member, said first-mentioned thrust being effective upon said valve member to position said valve member to reduce the pressure delivered by said valve member upon release of manual force from said control member irrespective of the thrust effect of fluid pressure in said second chamber.

In a transmission for a throttle control engine, a pump supplying fluid under pressure, throttle valve means connected to said pump and adapted to regulate pressure in accordance with manually determined throttle position, throttle valve means comprising a valve body having a cylindrical bore, a movable valve member and a manually movable control member mounted in said bore, a spring interposed between said members for transmitting force between said members, said manually movable member being movable in response to manual force applied thereto to increase the pressure delivered by said valve member, a first chamber at one end of said bore including a pressure responsive surface of said valve member, a second chamber at the other end of said bore including a pressure responsive surface of said manually movable control member, said first and second chambers being connected to pressure delivered by said valve member, said pressure in said first chamber applying a thrust to said valve member tending to bias said valve to a position to reduce the pressure delivered by said valve, said pressure in said second chamber applying a thrust to said control member tending to bias said valve member to increase the pressure delivered by said valve, said valve member surface in said first chamber having a larger effective area responsive to said pressure than said control member surface in said second chamber whereby the thrust of said control member acting in assistance to manual force applied to the control member is less than the thrust of said valve member, the thrust of said valve member being effective to position the valve member to reduce pressure delivered by said valve member upon the release of manual force from said control member irrespective of the thrust effect of said fluid pressure in said second chamber.

References Cited in the file of this patent
UNITED STATES PATENTS

| | | |
|---|---|---|
| 1,579,940 | Iversen | Apr. 6, 1926 |
| 2,663,393 | Livermore | Dec. 22, 1953 |
| 2,733,732 | Baker | Feb. 7, 1956 |
| 2,741,263 | Spencer | Apr. 10, 1956 |